(12) United States Patent
Kern et al.

(10) Patent No.: US 6,446,209 B2
(45) Date of Patent: Sep. 3, 2002

(54) STORAGE CONTROLLER CONDITIONING HOST ACCESS TO STORED DATA ACCORDING TO SECURITY KEY STORED IN HOST-INACCESSIBLE METADATA

(75) Inventors: Robert Frederic Kern; Mark Anthony Sovik, both of Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/825,456

(22) Filed: Apr. 3, 2001

Related U.S. Application Data

(63) Continuation-in-part of application No. 09/096,962, filed on Jun. 12, 1998.

(51) Int. Cl.[7] ................................................. G06F 1/24
(52) U.S. Cl. ...................... 713/193; 713/164; 713/165; 713/168
(58) Field of Search ............................... 713/164, 165, 713/168, 200, 201, 193

(56) References Cited

U.S. PATENT DOCUMENTS

| | | | |
|---|---|---|---|
| 4,322,576 A | 3/1982 | Miller | 178/22.07 |
| 4,423,287 A | 12/1983 | Zeidler | 178/22.08 |
| 4,888,800 A | 12/1989 | Marshall et al. | 380/21 |
| 5,070,528 A | 12/1991 | Hawe et al. | 380/48 |
| 5,455,863 A | 10/1995 | Brown et al. | 380/23 |
| 5,557,765 A | 9/1996 | Lipner et al. | 380/21 |
| 5,615,264 A | 3/1997 | Kazmierczak et al. | 380/4 |
| 5,633,934 A | 5/1997 | Hember et al. | 380/50 |

OTHER PUBLICATIONS

A.V. Le et al., "Method for Authenticating Key Data Records Using Message Authentication Codes," IBM Technical Disclosure Bulletin, vol. 34, No. 9, pp., 104–108, Feb. 1992.

Article entitled "Enterprise Systems Architecture/390 Principles of Operation," by IBM, date is more than one year before filing, pp., 3–8–3–15.

*Primary Examiner*—Thomas R. Peeso
(74) *Attorney, Agent, or Firm*—Dan Hubert & Associates

(57) ABSTRACT

A storage controller conditions host access to stored data objects upon host provision of a proposed key with matching or other prescribed relation to a security key stored in host-inaccessible metadata that is associated with the stored data object. The security key may be established upon writing the data or allocating storage space, for example. This enables the storage controller or device to be attached directly to a network without compromising security or having to add an intermediate server to perform security functions. Another implementation concerns sound recording playback devices that only play sound tracks for which the user has purchased an appropriate security key.

50 Claims, 9 Drawing Sheets

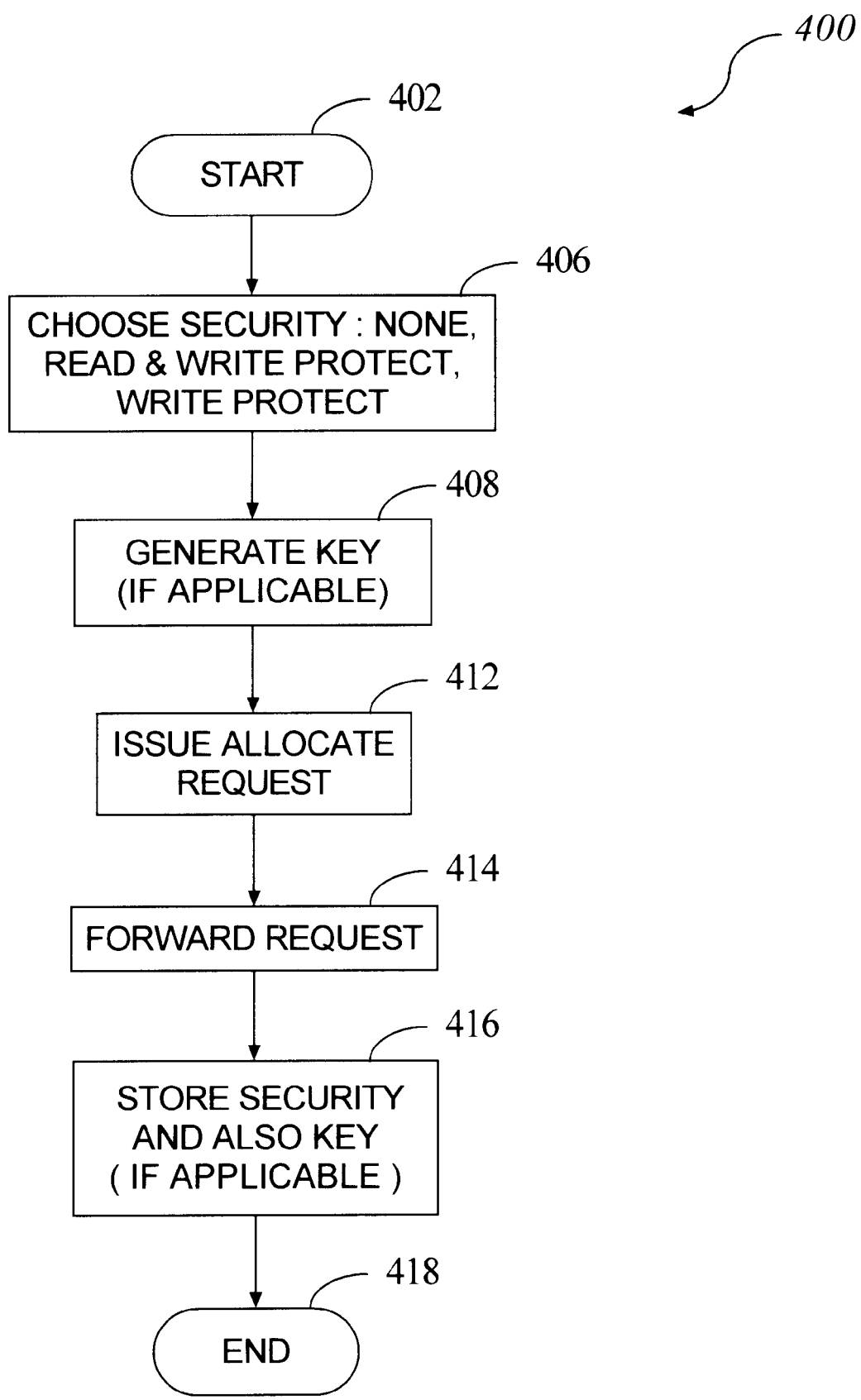

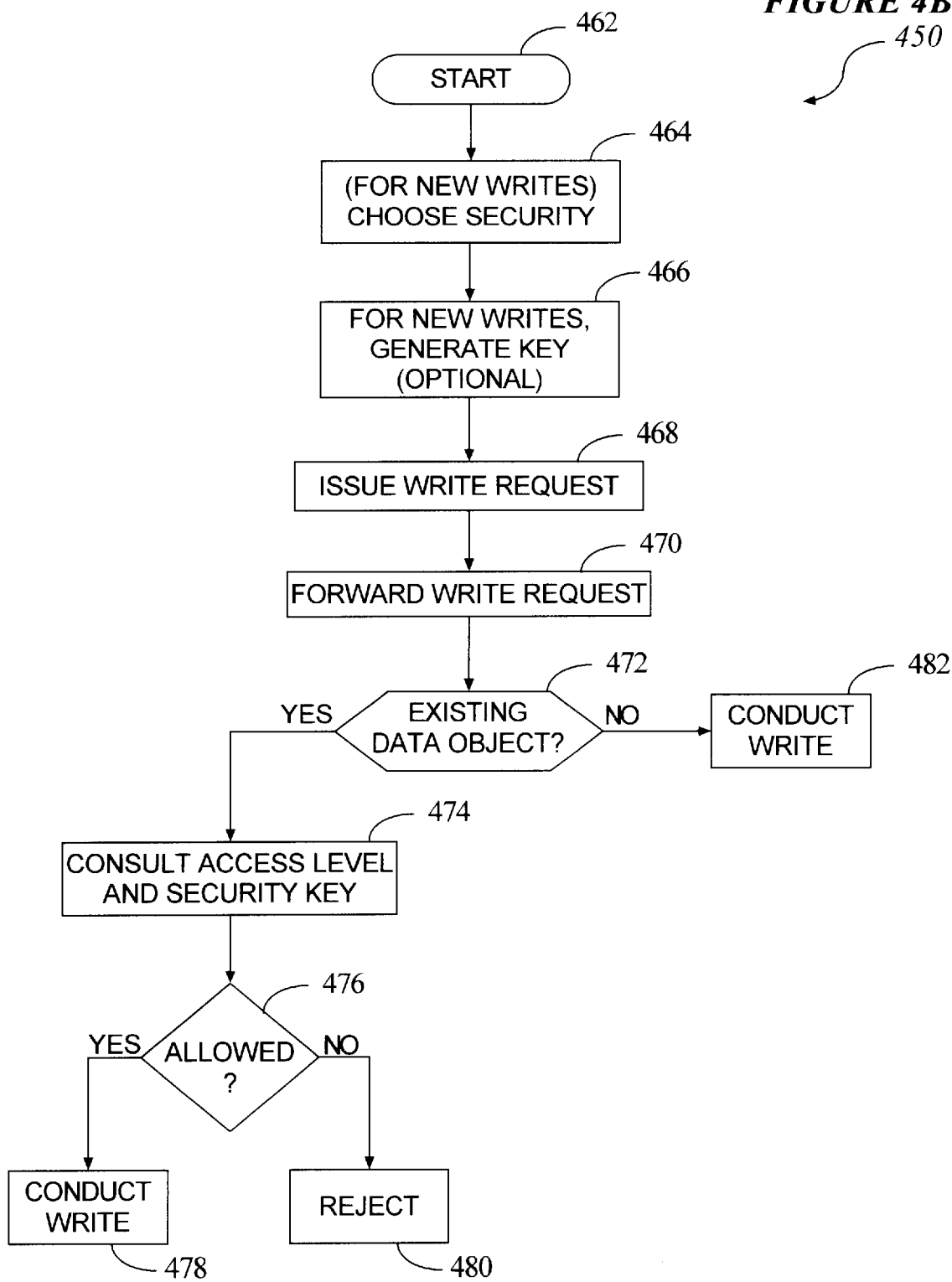

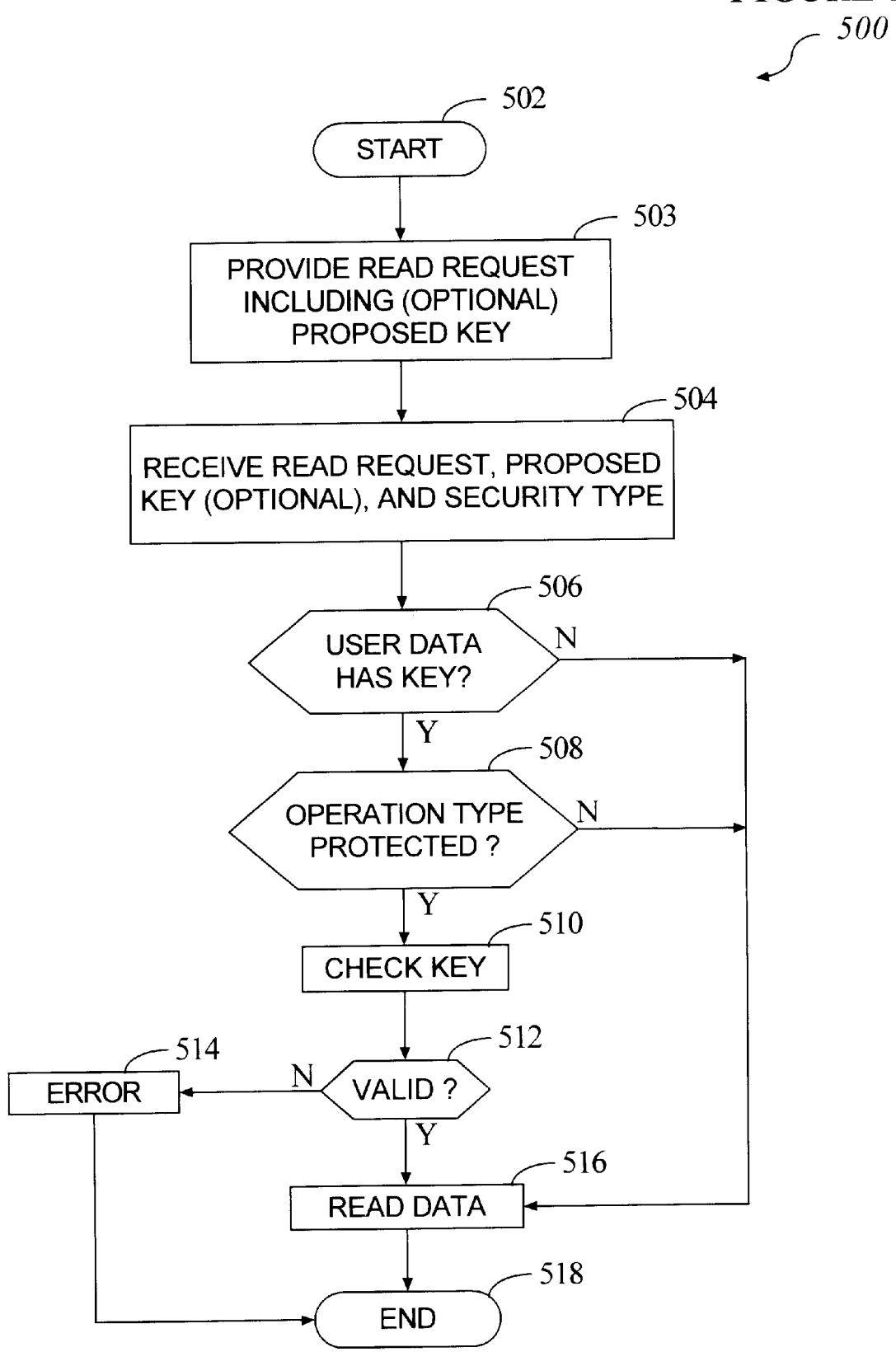

STORAGE CONTROLLER CONDITIONING HOST ACCESS TO STORED DATA ACCORDING TO SECURITY KEY STORED IN HOST-INACCESSIBLE METADATA

CROSS-REFERENCE TO RELATED APPLICATIONS

This application is a continuation-in-part of co-pending U.S. application Ser. No. 09/096,962, entitled "STORAGE SYSTEM WITH DATA-DEPENDENT SECURITY," filed on Jun. 12, 1998 in the names of the present inventors.

BACKGROUND OF THE INVENTION

1. Field of the Invention

The present invention concerns access security for digital data. More particularly, the invention is implemented in a storage or device controller to regulate data security using a key and other parameters stored in metadata. Among other benefits, this enables the storage controller or device to be attached directly to a network without compromising security or having to add an intermediate server to perform security functions.

2. Description of the Related Art

To get the most out of their storage systems, system administrators often provide common storage for access by multiple different users. The common storage is often coupled to individual user computers via intermediate hardware such as storage servers and networks. The common storage may be a single device, but more often comprises many different physical storage devices. Some examples of multi-user storage systems are: (1) corporate Intranet systems accessed by employee users, (2) telephone records accessible by telephone operator-users located around the state, nation, or world, (3) banking records accessed by remote customer-users operating automatic teller machines, and (4) engineering design specifications or models accessed by engineer-users working together on a technical project. A variety of other arrangements are also known.

In these systems, security of common storage is one difficult challenge facing storage system engineers. Since the common storage is effectively coupled to all users (via intermediate server machines), it is often necessary to consider the user's identity in deciding whether to provide (or deny) access to stored data. Some data may be suitable for all users to access, whereas other data may be only suitable for access by selected users. As an example, it may be desirable to provide all employees of the company access to the company's telephone directory stored on a common storage facility, while making personnel files available only to those in the human resources department.

Many known data security mechanisms address this problem by operating a central host or server as an access gate. This is feasible when the server alone is attached to the common storage, and therefore constitutes a natural gate. In this arrangement, all access requests are routed through this server, which accepts or rejects each request according to the identity of the requesting user and the content of the request. The server implements its security features by running a security software program. As one variation of this arrangement, there may be multiple servers coupled to the common storage, with each server running the same security program under the same operating system. These multiple servers can provide more users with concurrent access to the common storage. One example of a server comprises an IBM model S/390 product using the MVS operating system, where each server is coupled to a RAMAC storage subsystem.

Although conventional server-based storage configurations have proven satisfactory in many cases, many organizations are moving toward "network attached storage," which aims to save costs by placing storage systems directly on the network and thereby avoiding intermediate server machines. For especially convenient widespread and accessible use, storage systems are even coupled directly to the Internet in many cases. This avoids the need to purchase a dedicated server machine to serve as an intermediate security gate. This arrangement is especially beneficial for data that is being distributed, posted, or otherwise made available to users on a "read-only" basis because known mechanisms at the device or storage controller level may be invoked to universally prevent changes to the data.

Although this arrangement is beneficial insofar as it saves costs and conveniently makes data widely available, there are still some limitations. Chiefly, conventional network attached storage is not adequate for those users seeking to make data widely accessible yet selectively permit some users to modify and delete data. To implement more advanced security schemes, network designers must add-in intermediate security gates such as storage severs. In addition to the added cost, compatibility problems can arise, especially with data that is being shared on such a widespread basis as the Internet. Namely, it may be difficult or prohibitively expensive to program the server with a security scheme that is compatible with a diverse array of expected machines, such as WINDOWS machines, UNIX machines, MVS computers, SUN workstations, etc.

Consequently, known storage and security arrangements are not completely adequate due to these and other unsolved problems.

SUMMARY OF THE INVENTION

Broadly, the invention provides access security for stored digital data by using a storage or device controller to regulate data security according to a security key and other parameters stored in metadata. This enables the storage controller or device to be attached directly to a network without compromising security or having to add an intermediate server to perform security functions.

The storage system of this invention includes a storage controller coupled to a digital data storage. The controller is also coupled to, or at least accessible by, one or more hosts. The digital data storage contains host-accessible user data accessed by the storage controller on behalf of hosts, as well as host-inaccessible metadata used by the storage controller to manage the user data. Initially, the storage controller receives a write request from one of the hosts. Such a request includes a proposed key and target data to be written to storage. The storage controller stores the target data as host-accessible user data, and also stores the key as host-inaccessible metadata associated with the target data. Thereafter, the storage controller requires hosts to provide a key matching or having another prescribed relation to the stored key as a condition to granting future host requests to access the stored target data.

In one embodiment, the invention may be implemented to provide a method of conditioning host access to stored data according to keys stored in host-inaccessible metadata. In another embodiment, the invention may be implemented to provide an apparatus, such as a data storage system, utilizing storage controllers configured to condition host access to stored data according to keys stored in host-inaccessible metadata. In still another embodiment, the invention may be implemented to provide a signal-bearing medium or tangibly embodying a program of machine-readable instructions executable by a machine such as a storage controller to manage storage as discussed herein. Similarly, the invention may also be embodied by logic circuitry configured to manage storage as discussed herein.

The invention affords its users with certain distinct advantages. For instance, by using a storage controller rather than a server or host machine as a security gate, the invention provides storage security for a variety of different host computers that utilize comparatively incompatible operating systems. As another benefit, the invention is inexpensive because it may be implemented to provide data security using a network attached storage controller without using an expensive server machine. Similarly, the invention does not burden the processing and input/output resources of existing host machines with security functions, since security is implemented on the storage controller level. The invention is also beneficial because it provides a flexibility in implementation and may be applied in a variety of different environments. For instance, the invention may be applied to sound recordings to limit playback to users that have purchased an appropriate key. The invention also provides a number of other advantages and benefits, which should be apparent from the following description of the invention.

BRIEF DESCRIPTION OF THE DRAWINGS

FIG. 4A is a flowchart showing operations performed to allocate data storage according to the invention.

FIG. 4B is a flowchart showing operations performed to write data to storage according to the invention.

FIG. 5 is a flowchart showing controller operations performed to process a Read request according to the invention.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Storage System

Figure 1A:
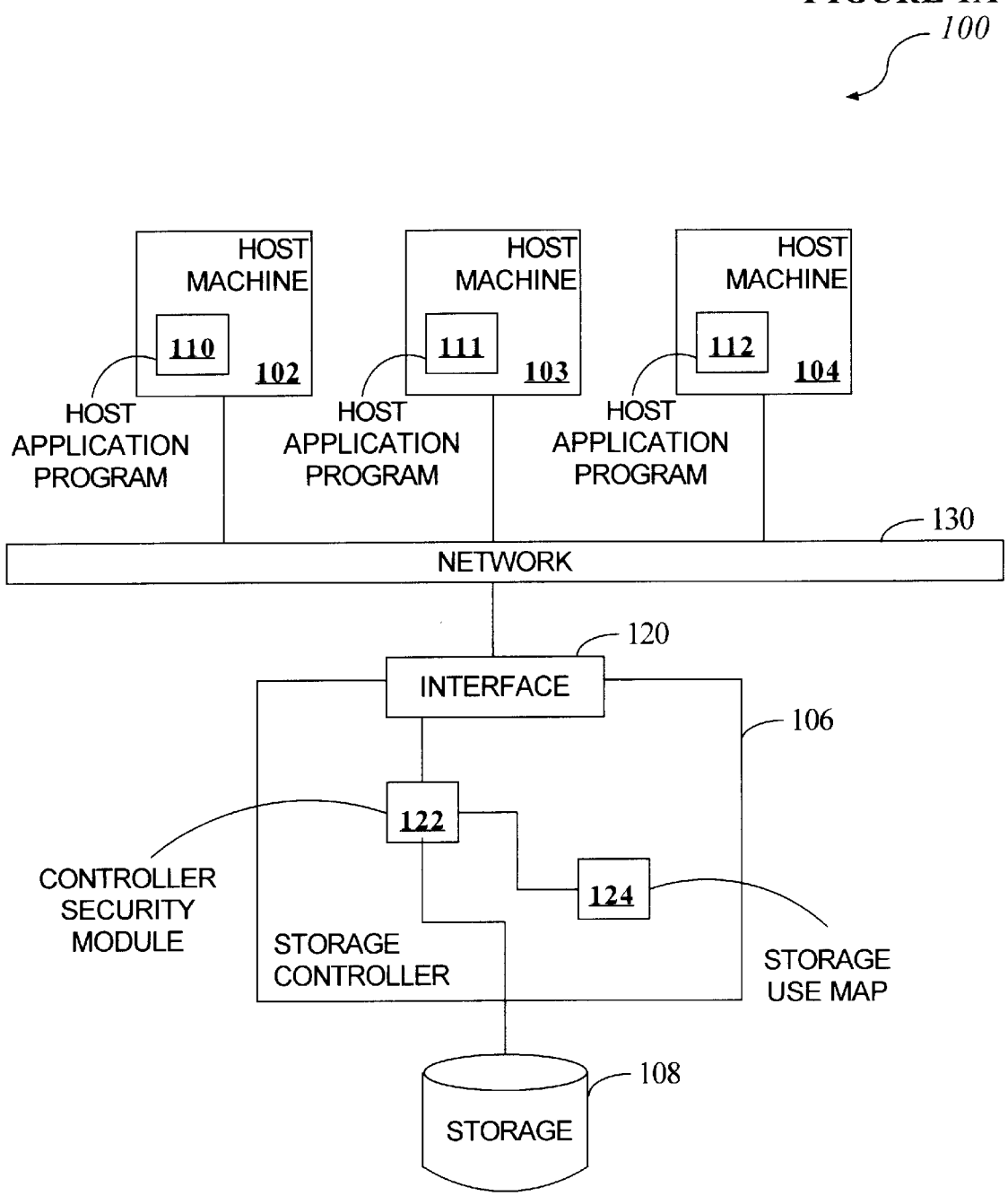
FIG. 1A is a block diagram of the hardware components and interconnections of a data storage system according to the invention.

One aspect of the invention concerns a data storage system, which maybe embodied by various hardware components and interconnections as shown by the system 100 of FIG. 1A. The system 100 includes multiple host machines 102–104, a network 130, a storage controller 106, and digital data storage 108 ("storage"). The host machines 102–104 are coupled to the network 130. Optionally, some or all of the hosts may be interconnected by various links (not shown). The hosts include respective host application programs 110–112. As used herein, "host" comprises any machine, user, application program, process, or other entity, that submits storage access requests to the storage controller 106. Furthermore, storage access requests of the illustrated hosts may arise from other sources (not shown), such as wireless telephones, sensors, satellites, or other sources.

Hosts

As illustrated, the host machines 102–104 comprise various hardware devices suitable to generate storage access requests, such as personal computers, mainframe computers, computer workstations, supercomputers, or other suitable machines. The illustrated host machines 102–104 may be running respective application programs 110–112, from which the need for nonvolatile storage access arises. According to one advantage of the invention, the host:machines 102–104 may be running a variety of different operating systems (not shown), which may even be incompatible with each other.

Some exemplary operating systems include MVS, UNIX, WINDOWS NT, etc.

Some or all of the host machines 102–104 may be interconnected by communications links (not shown) such as wires, cables, fiber optic lines, wireless links, satellite, telephone lines, etc. Alternatively, some or all of the host machines 102–104 may be completely unrelated, such as different host machines coupled to the Internet (i.e., the network 130) at different sites around the world. The host machines 102–104 may include respective interfaces (not shown), such as ESCON links, small computer system interfaces (SCSIs), telephone/DSL/cable modems, intelligent channels, and the like to interface with each other, the network 130, etc.

As mentioned above, each host machine 102–104 may be running one or more application programs, exemplified by the programs 110–112. Among other functions, the application programs 110–112 generate "storage access requests" seeking access to the storage 108. In the presently illustrated example, each storage access requests includes one or more of the following components:

1) A requested access type, such as Read, Write, Update, Allocate, Allocate and Write, etc.
2) If the requested access type is "Write", one or more data objects to be written to storage 108.
3) A key (optional) to be used by the controller 106 in determining access rights to the data objects involved in the subject access request.
4) In the case of an allocation request, specification of a storage size to allocate or identification of a particular storage region to allocate.

The contents, processing, and use of storage access requests are discussed in greater detail below.

Network

Optionally, the system 100 may also include one or more networks, such as the illustrative network 130. The network 130 is helpful to illustrate the embodiment (as shown in FIG. 1A) where the storage controller 106 provides network-attached storage.

The network 130 comprises any desired communication path(s) interconnecting host machines such as 102–104. One example is the public Internet or a corporate Intranet. Other examples include bus, star, or token ring configurations. The network 130 may utilize one or more local, metropolitan, and/or wide area networks. The network 130 may utilize TCP/IP, Systems Network Architecture, Ethernet, or any other desired protocol. Ordinarily skilled artisans (having the benefit of this disclosure) will also recognize other network configurations and protocols to implement the network 130.

With the foregoing connection of the network 130 to the storage controller 106, the storage controller 106 acts as network-attached storage, benefitting from the cost-savings of omitting a server or other intermediate gate. Nonetheless, a server, secondary host, or other machine may be interposed between the storage controller 106 and host machines 104 if desired. Furthermore, the network 130 may be omitted from the system entirely, in which case the storage controller 106 is coupled to a host machine 102–104 individually, coupled to a server or other intermediate machine that is itself coupled to the host machine, or coupled to a user interface for direct access by users.

Storage Controller—Introduction

Broadly, the storage controller 106 comprises a special purpose digital data processing machine dedicated to managing storage of data upon the storage 108. In contrast to servers and other machines, the storage controller 106 works with formatting, layout, encoding, parity checking, error correction, and other aspects of physically storing data on the media encompassed by the storage 108. Accordingly, the storage controller 106 generates, reads, formats, and utilizes host-invisible metadata that is stored with host-accessible "user data" in the storage 108. In contrast, the host machines 102–104 and application programs 110–112 deal with the user data itself, but cannot access the metadata. The hosts may reference user data according to logical addresses, in which case the storage controller 106 translates between logical addresses (as used by the hosts) and physical addresses (relating to the storage media itself.

Figure 1B:
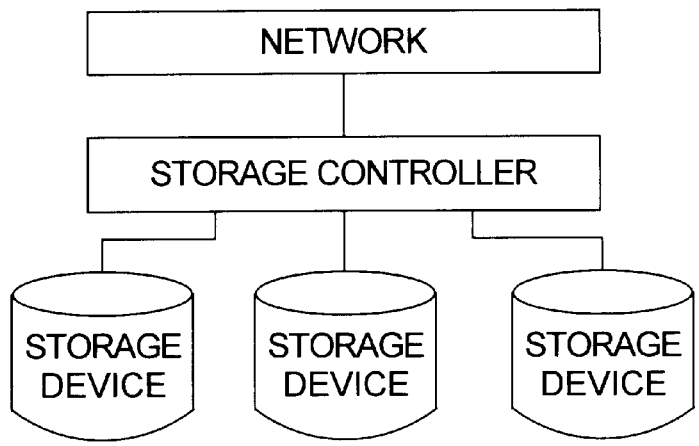
FIGS. 1B–1E are block diagrams showing different system configurations according to the invention.
Figure 1C:
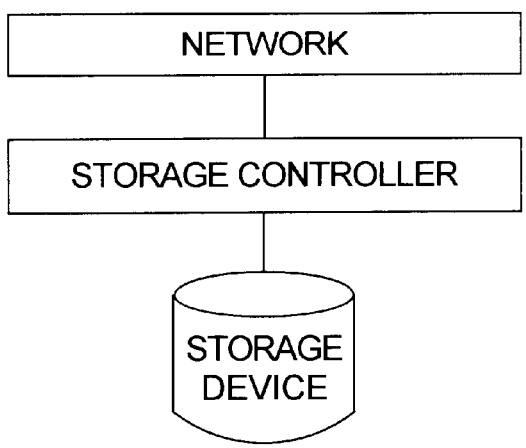
Figure 1D:
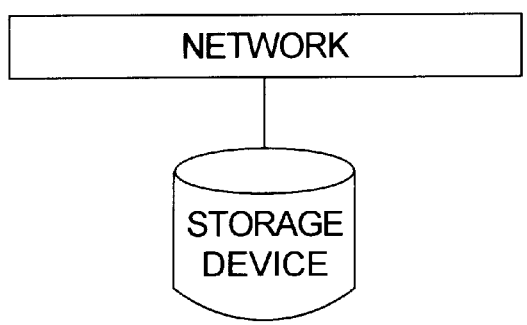

The storage controller 106 may be implemented in a number of different ways. For instance, the storage controller 106 may be implemented by a device controller. Some examples include a hard drive controller, optical disk controller, CD-ROM controller, tape drive, floppy diskette drive, or other mechanism that is associated with a particular removable or nonremovable media type. In another embodiment, the storage controller 106 may comprise one or more supervisory processing machines managing a number of subservient device controllers. Some examples include the IBM xSeries 150 Network Attached Storage, IBM Enterprise Storage Server Models F10 and F20, IBM RAMAC product line, etc. FIGS. 1B–1D illustrate several exemplary configurations of storage controllers and devices, as discussed below.

The storage controller 106 includes an interface 120 to communicate with the network 130 (as illustrated), server, host, etc. The interface 120 may comprise an intelligent digital input/output communication channel, modem, interface card, bus, backplane, port, connector, or any other interface suitable to the particular application.

Digital Data Storage

As explained above, the storage 108 serves to store data as directed by the storage controller 106. The storage 108 may include storage media along with one or more device controllers that are managed by the storage controller 106, as in the examples of FIGS. 1B–1C. In a different example, the storage 108 may include the media only, where the media's device driver embodies the storage controller 106, as in the example of FIG. 1D.

In any case, the storage 108 may be implemented by media of various types, such as magnetic disk drive, magnetic tape, optical disk, optical tape, semiconductor memory, a combination of the foregoing, or any other suitable digital data storage media. The storage 108 may be configured as a single "logical" device, where data is actually stored on separate physical devices. As a specific example, the storage 108 may be implemented by the magnetic disk drive media units of an IBM RAMAC disk drive system.

Non-Network Implementation

As still another example of the implementation of this invention, any of the embodiments of FIGS. 1B–1D may be implemented as a local storage/retrieval apparatus by substituting a user interface for the component as "network." In this embodiment, as described in greater detail below, the storage or device controller grants different access rights to people operating the user interface depending upon the security key that they supply.

Figure 1E:
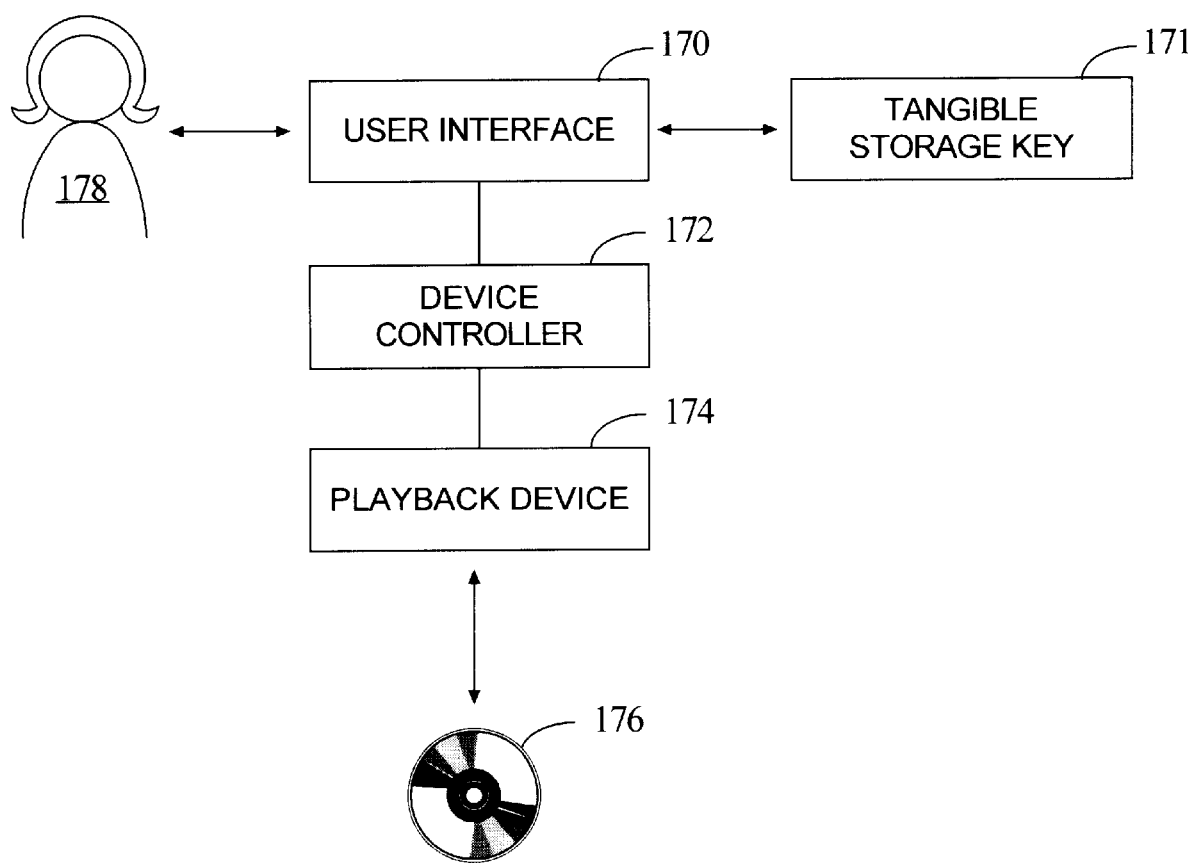

FIG. 1E describes a particular example of this embodiment, including a playback device 174 that comprises a music CD player that selectively plays songs stored on removable CD media 176 according to a security key entered by a user 178 via a user interface 170. Security functions are implemented by device controller 172. Here, the CD media 176 is write-only, and the approved security keys for each song are stored on the media at the time of manufacture.

The user interface 170 may comprise a keypad for entering security keys. To enhance security, instead of using a keypad, the user interface 170 may comprise a module to receive tangible security keys such as 171, which comprise plug-in chips/cassettes that are plugged-in to the interface 170, magnetic cards that are swiped or waved past the interface 170, etc., where the tangible security key 171 contains a machine-readable representation of a security key. In this embodiment, users purchase a music CD for one low price, and then purchase the tangible security key containing the security key associated with to the songs they wish to hear. Although CDs are given in the foregoing example, other media may be used without departing from the invention.

Storage Controller—Gate Function

In addition to its function in managing the storage 108, the controller 106 operates as a gate, selectively accepting or refusing hosts' access requests according to a preestablished data security scheme. Since this scheme is implemented by the controller 106 rather than one or more hosts 2–104, the hosts are available for other tasks. Additionally, the storage controller's centrality and independence from the hosts 102–104 is conducive to access by hosts of many different operating systems. Furthermore, the controller's security features enable the storage controller 106 to be used as network-attached storage, providing security without the need for a server or other intermediate security gate.

Storage Controller—Gate Function, First Example

The controller 106 includes a controller security module 122, which performs the controller's security functions. The security module 122 may comprise a hardware component, such as one or more computers, microprocessors, logic circuits, ASICs, or other digital data processing apparatus. Alternatively, the security module 122 may be an application program comprising a sequence of programming instructions executed by one or more processors of the controller 106.

Generally, as a condition to granting storage access to hosts, the controller's gating function requires it to consult a "reference location" containing a security key associated with the data being sought. The stored security key may be called the "reference security key." The controller 106 evaluates the reference security key against a proposed security key from the storage access request to determine whether the request should be permitted. The contents and use of security keys are discussed in greater detail below.

The reference location constitutes storage space accessible to the controller 106, and in one example comprises data (including the reference security key) stored at the controller 106 as illustrated by the storage use map 124. The map 124 may be located elsewhere if desired such as in the storage 108 or other site accessible to the controller 108. TABLE 1 (below) depicts an example of the storage use map 124, in the form of a lookup table.

TABLE 1

EXEMPLARY STORAGE USE MAP

| STORAGE REGION | REFERENCE SECURITY KEY | SECURITY TYPE |
|---|---|---|
| 00001 | 1 | WRITE |
| 00002 | 1 | WRITE |
| 00003 | 1 | WRITE |
| 00004 | NONE | NO SECURITY |
| 00005 | NONE | NO SECURITY |
| 00006 | 2 | READ/WRITE |
| 00007 | 2 | READ/WRITE |
| 00008 | NONE | NO SECURITY |

In the example of TABLE 1, the "storage region" column identifies regions in the storage 108. The "reference security key" lists an access key that governs access to the associated storage region. The storage controller 106 may utilize the reference security key to govern access to the storage region according to various techniques, such as password, public/ private key encryption, or others as explained in detail below. In this simplified example, reference keys of "1" and "2" are provided for ease of explanation, however more complicated codes may be used. For each storage region, the associated "security type" (also called "access level") designates the security precautions applicable to the corresponding storage region. For example, the security type may specify operations that are prohibited without the requesting host submitting an input key (also called "proposed security key") that satisfies the prescribed reference security key. The security type may require the storage controller to prevent, without host provision of a proposed security key that satisfies the reference security key, one or more of the following operations: read, write, delete, update, format, etc.

As a variation, TABLE 1 may be condensed by listing abbreviated pointers to other storage locations that contain the actual values of storage region, reference security key, and/or security type. Furthermore, TABLE 1 may be encrypted by controller 106 to prevent accidental/malicious access of its contents.

As still another variation, TABLE 1 may omit anything to do with read security, wherein the storage controller 106 stores user data encrypted with an associated security key, and read security is thereby inherently provided by the storage controller 106 decrypting user data with whatever proposed key is supplied by the host. In this example, encryption may use the public/private key architecture, where each user can only encrypt all public data and private data associated with the user's private key.

Storage Controller—Gate Function, Second Example

As an alternative to the storage use map 124, the storage controller 106 may carry out its gate function by incorporating the reference security key into metadata associated with user data in the storage 108. In this embodiment, the storage use map 124 may be omitted.

Figure 1F:
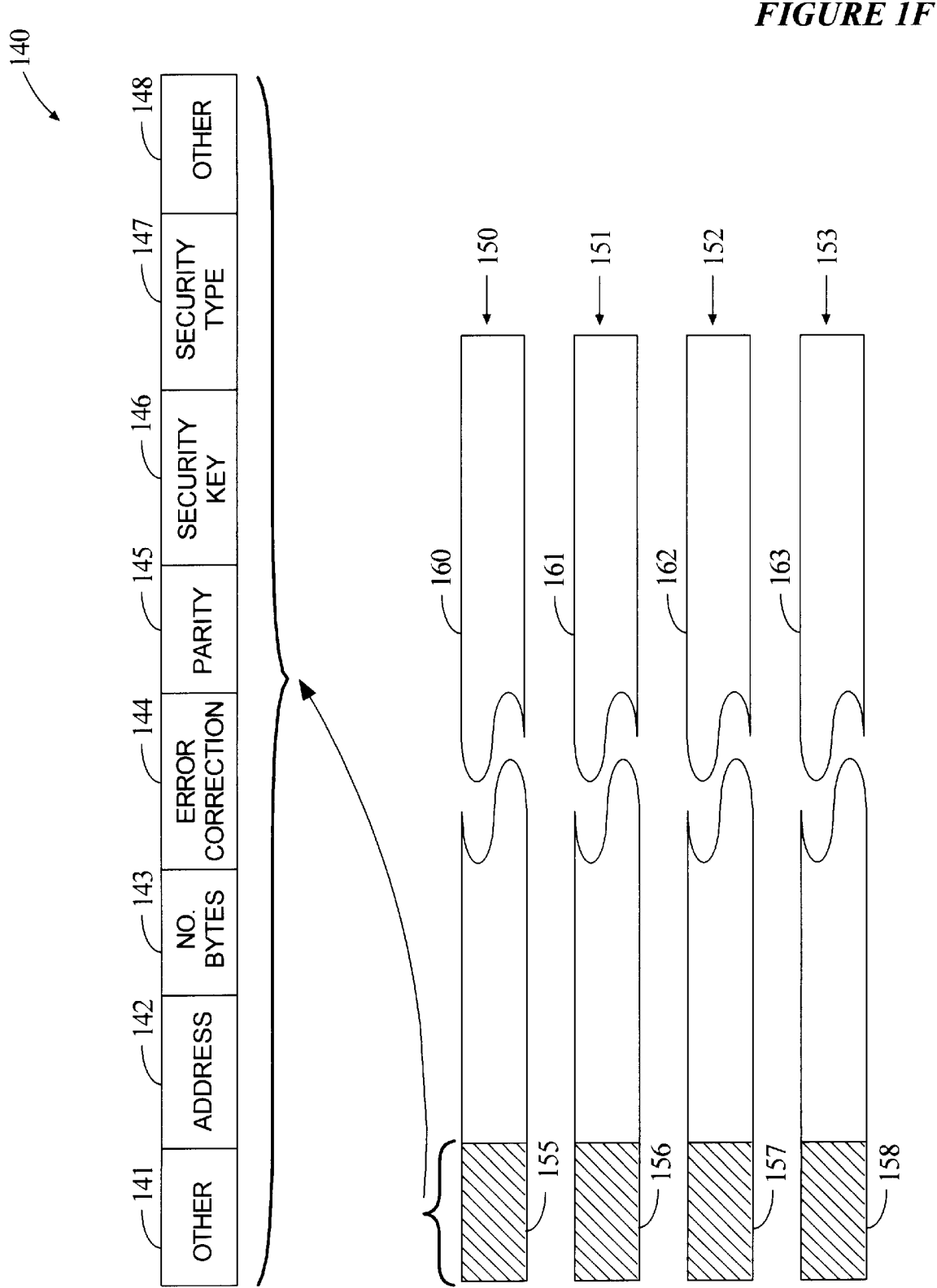
FIG. 1F is a block diagram showing several exemplary storage tracks and their constituent data objects and metadata according to the invention.

FIG. 1F describes an example of a subsection of storage 108 implementing this feature. For ease of discussion FIG. 1F illustrates the contents of several exemplary tracks 150–153 of data that reside upon a magnetic disk storage medium in the storage 108. Although it is understood that disk tracks are actually circular, the tracks 150–153 are shown in linear form for ease of explanation. Each track 150–153 includes a respective region of user data 160–163 and an associated region of metadata 155–158. The metadata regions 155–158 may precede the user data regions 160–163 (as shown), follow the user data, be interspersed with the user data, or another arrangement as suits the application.

The storage controller 106 initially stores the user data on behalf of hosts that provide the data; the storage controller 106 may also carry out host requests to modify, read, delete, or otherwise manage such user data. Thus, the user data 160–163 is said to be host-accessible. In contrast, the metadata 155–158 is used solely by the storage/device controllers to manage storage and retrieval of the user data. In this sense, the metadata 155–158 is host-inaccessible.

The block 140 shows the contents of metadata 155 in greater detail, according to one example. The metadata block 140 includes information such as the track address 142, number of bytes 142 of user data in that track, error correction control information 144, parity information 145, a reference security key 146, and security type 147. Different or other 141, 148 items of metadata may also be used, depending upon the application. The reference security key 146 and security type 147 have function and content as described above in conjunction with TABLE 1.

Without any intended limitation, the foregoing example shows items of metadata 155–158 that number one per track 150–153. In this example, each item of metadata (and its reference key and security type) pertains to one track, which constitutes the storage region associated with that metadata. Thus, in this example, the reference security key 146 governs host access to the track 150. As a further enhancement, a reference security key may be associated with a multitrack data object by listing that reference security key in the metadata of each track occupied by the data object. The present invention also contemplates a variety of other approaches, where the reference security key 146 and security type 147 are stored in metadata associated with a data object, extent, byte, range of tracks or address, sector, block, record, file, page, record, logical cylinder, logical device, physical device, or another suitable arrangement depending upon the application. Furthermore, multiple security keys may be provided with each item of user data, with one, some, or all of the security keys having a different security type associated therewith.

In the case of removable storage media (such as CD-ROM or floppy diskettes), it may be advantageous to structure the metadata and/or user data to be unreadable by conventional device controllers. This prevents reading of the media by a conventional device controller that is not programmed to honor the security-features of the metadata 155–158.

Storage Controller—Gate Function, Second Example (CD-ROM)

FIG. 1F is now re-described in the context FIG. 1E, described above. Here, the storage 108 comprises a CD or other sound recording 176 and the storage controller 106 comprises a playback device 174. In this example, reference one or more s are incorporated into metadata associated with recorded songs, tracks, or other segments at the time of manufacture, and the storage use map 124 is omitted. In As example, rather than describing tracks of a magnetic storage disk, the items 150–153 refer to music "tracks" on the sound recording media, where each track corresponds (for example) to a different song. Each track 150–153 includes a respective region of sound recording data (referred to as a "song without any intended limitation") 160–163 and an associated region of metadata 155–158. The metadata regions 155–158 may precede the songs 160–163 (as shown), follow the songs, be interspersed with the songs, or another arrangement as suits the application.

All contents of the sound recording are permanently written at the time of manufacture. Therefore, neither the metadata 155–158 nor the songs 160–163 are rewritable. The songs 160–163 are said to be user-accessible, since they are audibly played back to the user 178. In contrast, the metadata 155–158 are used solely by the controller 172 to manage retrieval of the songs, and is therefore considered user-inaccessible. The metadata 155–158 is structured to prevent reading by conventional CD players.

The block 140 shows the contents of metadata 155 in greater detail, according to one example. The metadata block 140 includes information such as the address 142 of the associated song 160 on the media 176, number of bytes 142 that the song 160 occupies in that track, error correction control information 144, parity information 145, a reference security key 146, and security type 147. Different or other 141, 148 items of metadata may also be used, depending upon the application. The reference security key 146 and security type 147 have function and content similar to that described above, however only the security type "Playback Requires Security Key" is utilized. Thus, if a user cannot provide the requisite security key, the device controller 172 will not play the subject song. Optionally, additional reference keys and associated security types (not shown) may be provided with each track. In this way, the CD manufacturer or record label may offer an inexpensive license enabling users to listen to a limited number of songs (such as songs one, two, and three), and a more expensive license enabling users to listen to all songs on the media 176. Furthermore, if desired, a sufficient number of security keys and security types may be stored to anticipate access to every possible combination of some or all of the songs on the CD, so that users could purchase a license limited to songs desired by that user. In this embodiment, rather than pressing dozens of media with different combinations of songs thereon (as in the current state of the art), every song of an artist may be put on a single media, with user access limited by security key to the songs associated with that security key.

Exemplary Digital Data Processing Apparatus

The storage controller 106 (or device controller 172) may be embodied by various hardware components and interconnections. One example is given by the digital data processing apparatus 200 in FIG. 2. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory, and may be used to store the programming instructions executed by the processor 202. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for exchanging data with the processor 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

OPERATION

In addition to the various hardware embodiments described above, a different aspect of the invention concerns a method of providing access security for digital data by using a storage or device controller to regulate data security according to a security key and other parameters stored in the data's metadata. This enables the storage controller or device controller to be attached directly to a network without compromising security or having to add an intermediate server to perform security functions.

Signal-Bearing Media

Figure 2:
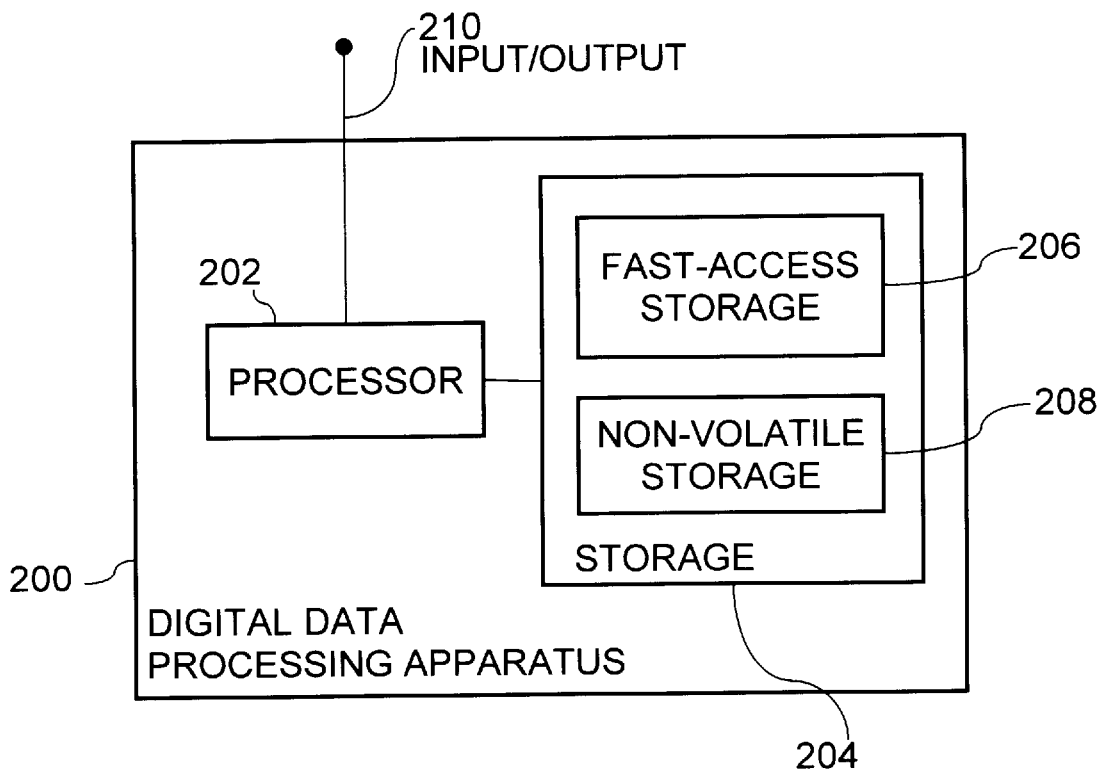
FIG. 2 is a block diagram of a digital data processing machine according to with the invention.
Figure 3:
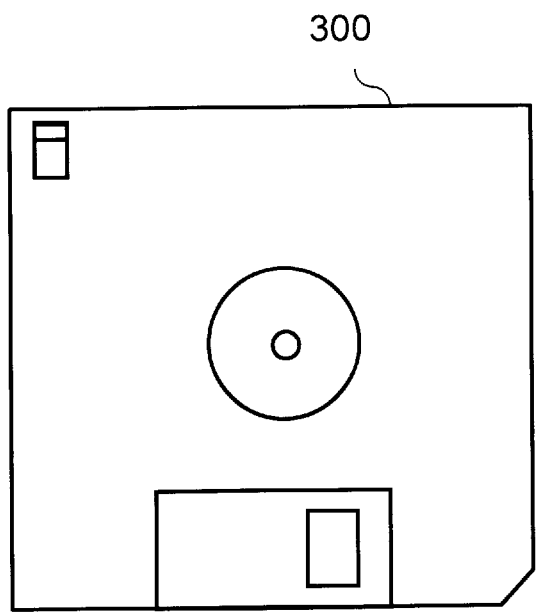
FIG. 3 shows an exemplary signal-bearing medium according to the invention.

In the context of FIGS. 1A–2, such a method may be implemented, for example, by operating the storage controller 106 (or device controller 172), as implemented by a digital data processing apparatus 200, to execute a sequence of machine-readable instructions. These instructions may reside in various types of signal-bearing media. This signal-bearing media may comprise, for example, RAM (not shown) contained within the controller 106, as represented by the fast-access storage 206. Alternatively, the instructions may be contained in another signal-bearing media, such as a magnetic data storage diskette 300 (FIG. 3), directly or indirectly accessible by the processor 202. Whether contained in the storage 204, the diskette 300, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Allocating Storage

FIG. 4A shows a sequence 400 performed to allocate space in the storage 108 according to the invention. For purposes of illustration, without any limitation, allocation as discussed herein is a host-managed operation. Allocation may be driven by the storage controller 106 in other examples. For ease of explanation, but without any limitation intended, the example of FIG. 4A is described in the context of the environment described above in FIGS. 1A–1D, 1F, 2, 3.

The sequence is initiated in step 402, when one of the application programs 110–112 experiences conditions requiring allocation of storage. The condition causing step 402 may further dictate relevant aspects of the necessary allocation operation, such as (1) the type of storage device to be used in the allocation operation if the storage 108 contains different types of storage media, (2) the size of region to allocate, and (3) other pertinent aspects. Allocated storage regions may be expressed in terms of any convenient or appropriate unit of granularity, such as one or more disk sectors, disk tracks, disk "extents", logical volumes, address ranges, blocks, tape tracks, files, datasets, etc. Storage regions may also have user-specified sizes, in which event this additional characteristic may be included in the allocation request. If desired, one or more storage regions may comprise subsets of a larger data structure, such as a database, file, storage group, dataset, etc; advantageously, this embodiment may facilitate different levels of security for subsets of a larger data structure.

In step 406, the application program 110–112 chooses a desired level of security for the region to be allocated. In this example, the levels of security, also called "security types" or "access levels" include:

1) "read/write protect" where both Reads and Writes are prohibited. Here, the storage controller 106 prevents reading and writing to the associated storage region unless the host presents an appropriate key.

2) "write protect" where Writes are prohibited but Reads permitted. Here, as discussed in greater detail below, the controller 106 will prevent hosts from writing the storage region unless the host presents an appropriate key. The associated storage region may be freely read.

3) "none" or "no security," where any host can read and write to this storage region without presenting a key. As an example, "none" may be used as a default value if another security type is not chosen.

In addition to the foregoing security types, additional parameters may be included, such as a per-access specification that applies the specified security type only for certain accesses, such as "all" accesses by a host, or only the "first" access by the host. After step 406, the application program 110–112 generates a reference security key (if some type of security was selected in step 406) to be used by the controller 106 in regulating future host access to the allocated storage region. The "reference" security key provides a reference copy against which hosts' proposed keys are to be evaluated. The reference security key of step 408 may comprise an alphabetic, numeric, alphanumeric, or other machine-readable code. As an example, the reference security key may comprise a 256-bit digital number, selected in accordance with a public key encryption scheme, as discussed below. Optionally, the application programs 110–112 may be configured such that, if the host seeks to extend an already-allocated storage region, the storage step 408 utilizes the region's existing reference security key instead of generating a new one.

After step 408, the application program 110–112 issues a request to allocate storage or extend allocation of already-allocated storage (step 412). This request includes the reference security key and security type of steps 406, 408 and may be issued in the form of a command to a host operating system, another application program on the same host that manages storage requests, or directly to the storage controller 106. If the allocation command is issued to the host machine or another application program, step 414 is performed, where the recipient relays the allocation request to the controller 106, for example, by issuing an allocate command with a set-reference-key parameter, specifically directing the controller 106 to associate the provided reference key and security type with the storage region to be allocated. On the other hand, if the allocation request is given directly to the storage controller 106, step 414 may be omitted. As an alternative to the foregoing, the recipient storage controller 106 may provide the security key on behalf of the host, in which case step 408 is omitted.

Following step 414, (or step 412 if step 414 is omitted) the controller 106 stores the security type and reference security key in a prescribed reference location, in association with the allocated storage region (step 416). As mentioned above, one example of the reference location is the storage use map 124; in this embodiment, the controller 106 in step 416 stores the key and security type in the map 124. In another example, the reference location may comprise host-inaccessible metadata in the allocated storage region itself, as explained above in conjunction with FIG. 1F; in this example, step 416 involves storing these items in metadata such as 155–158, the associated user data being empty.

After step 416, the requested allocation is complete, and the sequence 400 ends in step 418. In the allocated storage region is now available for selective access by the hosts, depending upon the established security type and the hosts' ability to provide an acceptable key.

Writing Data to Storage

FIG. 4B shows a sequence 450 performed to write data to the storage 108 according to the invention. For ease of explanation, but without any limitation intended, the example of FIG. 4B is described in the context of the environment described above in FIGS. 1A–1D, 1F, 2, 3. The sequence 450 is initiated in step 462, when an occasion arises for one of the application programs 110–112 to write data to the storage 108.

In step 464, the application program 110–112 chooses a desired security type for the data to be written. The security types in this example include read/write protect, write protect, and none as explained above. After step 464, the application program 110–112 generates a reference security key (step 466); step 466 may be omitted if "none" was selected as the security type in step 464. The reference security key of step 466 comprises an alphabetic, numeric, alphanumeric, or other machine-readable code as discussed above.

Optionally, the application programs 110–112 may be configured such that, if the present Write operation seeks to append, update, or otherwise modify previously written data, step 466 comprises the application program attempting to supply the believed reference security key for the previously written data.

After step 466, the application program 110–112 issues a write request (step 468). The write request constitutes a command to write data to the storage 108, and may specify relevant aspects of the operation, such as the type of storage device to be used in the Write operation if the storage 108 contains different storage modes, and other pertinent aspects. More particularly, step 468 involves the application program 110–112 issuing a Write request along with the user data to be written, a proposed key (if attempting to modify existing data), and a new reference key and security type (if writing new data). The request of step 468 may be issued to a host operating system, another application program on the same host that manages storage requests, or directly to the storage controller 106.

If the Write request is issued to the host machine or another application program, step 470 is performed, where the recipient relays the Write request to the controller 106. In the case of a new Write, the recipient may provide its directions to the controller 106 by issuing a Write command with a set-reference-key parameter, specifically directing the controller 106 to associate the provided reference key and security type with the user data proposed for storage. For data that already exists on the storage 108, the Write request recipient may provide its directions to the controller 106 in the form of a Write command with a proposed-key-parameter.

Following step 470, the controller 106 determines whether the user data proposed for storage is new or existing in the storage 108 (step 472). This is performed by cross-referencing information from the Write request (from step 470) with information that the controller 106 maintains about data in the storage 108. If the proposed data object is new, the controller 106 stores the data, and also stores the security type and reference security key in a prescribed reference location, in association with the allocated storage region (step 482). As mentioned above, one example of the reference location is the storage use map 124; in this embodiment, the controller 106 in step 482 stores the reference security key and security type in the map 124. In another example, the reference location may comprise host-inaccessible metadata in the user data itself, as explained above in conjunction with FIG. 1F; in this example, step 482 involves storing these items in the metadata associated with the identified user data. For example, they may be stored preceding the user data, in a metadata header, as shown in FIG. 1F. Other locations may be used instead, such as metadata interspersed throughout the data object, a metadata suffix, or another location. In the case of a write operation, step 482 also involves the storage controller 106 writing the user data to storage 108.

As one enhancement to the embodiment described above, the controller 106 may direct the storage 108 to employ the reference security key to encode the user data during the Write operation of step 482. Namely, the controller 106 may use the reference security key to encode the user data supplied by the host and then store the data as encoded. Encoding and decoding in this embodiment may use a number of different techniques that are well known to those in the relevant art. For instance, one useful technique is public/private key encryption. By using such encoding/decoding, stored data enjoys two levels of protection: (1) one level, by the controller 106 requiring requesting hosts to submit a proper proposed key to access the user data, and (2) another level, by encoding the user data itself with the security key.

On the other hand, if the proposed user data to be written already exists in storage, step 472 advances to step 474, where the controller 106 consults the reference security key and security type fields 146–147 associated with the user data to determine the security type and reference security key. The controller 106 in step 476 then determines whether the proposed Write operation is allowed. Namely, the Write operation is not allowed if the security type of the existing user data is "read/write protect" or "write protect" and the proposed key is not appropriate to the reference security key. For instance, the proposed/reference keys may be required to match, or there be a match between derivatives of one or both. If the Write operation is not allowed, step 476 advances to step 480, where the controller 106 rejects the requested Write operation. For instance, the controller 106 may return an error message to the requesting host. On the other hand, if the requested Write is permitted, step 476 advances to step 480, where the controller 106 performs the Write operation upon the storage 108. Optionally, the controller 106 may direct the storage 108 to employ the reference security key in encoding data during the Write operation of step 480.

The sequence 450 ends after completion of steps 478, 480, or 482.

Reading Data from Storage—General

FIG. 5 shows a sequence 500 of reading data from storage 108. For ease of explanation, but without any limitation intended thereby, the example of FIG. 5 is described in the context of the environment described above in FIGS. 1A–1D, 1F, 2, 3.

The sequence 500 begins in step 502 when an occasion arises for one of the application programs 110–112 to read data from the storage 108. This may originate from a source such as an internal process of the application program, another application program of the requesting host, a user terminal or other input device (not shown) coupled to the host, another computer coupled to the host, etc. In step 503, responsive to the event of step 502, the application program generates a Read request including (1) identification of desired user data ("target user data"), such as by name, logical or physical storage location, storage device, etc., and (2) a proposed key for use by the controller 106 to determine whether the application program should have access to the requested user data. If the Read request of step 503 seeks access to user data whose security type is "none," the proposed key may be omitted from step 503. The Read request of step 503 may be issued to the host machine, another application program, or directly to the controller 106.

In step 504, the controller 106 receives the Read request of step 503. In response, the controller 106 determines whether the target user data is protected, i.e., whether a reference location has associated a reference security key with the target user data (step 506). This is performed by the controller 106 consulting the storage use map 124 (one example) or the metadata (other example). If the target user data does not have an associated reference security key, this storage region has no security protection and further analysis is unnecessary. In this case, the routine 500 passes from step 506 to step 516, where the controller 106 operates the storage 108 to read and output the requested user data. Following step 516, the sequence 500 ends in step 518.

If the target user data is protected, however, step 506 advances to step 508. In step 508 the controller 106 determines user data's security type. Namely, the controller 106 consults the reference location to retrieve the security type associated with the target user data, and thereby determine whether Read operations are permitted without submittal of a suitable proposed access key. In one example, step 508 may be performed by the controller 106 consulting the security type 147 in metadata to see whether Read operations are protected. Alternatively, step 508 may be performed by the controller 106 consulting the storage use map 124 to determine whether Read operations are protected. If Read operations are not protected, step 508 advances to step 516, where the controller 106 directs the storage 108 to read and output the requested data object (step 516), and then the sequence 500 ends in step 518. Optionally, the reference security key may be used to decrypt the user data if the user data has been encrypted.

If step 508 finds that Reads of the requested user data are protected, the routine 500 advances from step 508 to step 510. In step 510, the controller 106 checks the host-submitted proposed key (received in step 504) against the reference security key (found in the reference location, e.g., key 146 or storage use map 124). In one example, step 510 involves comparing the proposed and reference security keys to see whether they match. Alternatively, step 510 may apply a predetermined processing sequence to derive a second key from the proposed key (such as by decryption using a different, prescribed private key), with this derived key being compared against the reference key. Alternative, the reference security key may be processed to derive a second key, with this derived key being compared to the proposed key. Other alternatives are also contemplated, such as processing both reference and proposed keys and comparing their derivatives.

At any rate, if the proposed key (or its derivative) does not match the reference security key, the proposed key is not valid. In this case, step 512 advances to step 514 where the controller 106 returns an error condition to the requesting host. Otherwise, if step 512 finds that the proposed key (or its derivative) matches the reference access key (or its derivative), the proposed access key is valid, and the controller 106 directs the storage 108 to complete the requested Read operation in step 516. After steps 514 or 516, the sequence 500 ends in step 518.

As one enhancement to the embodiment described above, the controller 106 may direct the storage 108 to employ the reference security key in decoding data during the Read operation of step 516. In this embodiment, the controller 106 uses the reference security key to decode the stored user data, and then provides the decoded data to the requesting host. Such decoding may utilize a number of different techniques that are well known to those in the relevant art, such as public/private key encryption.

After step 516, the routine 500 ends in step 518.

Reading Data from Storage—Local User Interface, Read-Only Media

Another description of FIG. 5 is now made to specifically illustrate the playback of data from CD media 176 in the environment of FIG. 1E. In this example, the CD media 176 comprises a read-only music CD that is provided with one or more reference security keys 146 and operation parameters 147 (as described in FIG. 1F) at the time of manufacture. In this embodiment, the storage use map 124 is omitted, since the media 176 contains security information in its metadata. As described above, the media 176 may contain several different reference keys 146 in association with each song.

Referring to FIG. 5 in conjunction with FIG. 1E, the sequence 500 begins in step 502 when a user 178 decides to listen to one or more songs on the CD 176. The user 178 submits a proposed security key by entering the key into the user interface 170, or by providing a tangible security key 171 to the interface 170. In step 503, responsive to the event of step 502, the user interface 170 generates a Play request including (1) identification of one or more desired songs, such as by name, logical or physical storage location, storage device, etc., and (2) the user's proposed key. Also in step 503, the interface 170 forwards the Play request to the device controller 172 to determine whether the user should have access to the requested user data. If the Play request of step 503 seeks access to user data whose security type is not "Playback Requires Security Key," the proposed key may be omitted from step 503.

In step 504, the controller 172 receives the Play request of step 503. In response, the controller 172 determines whether the target song tracks is protected, i.e., whether each requested song track has an associated reference key (step 506). This is performed by the controller 172 consulting the song track's metadata. If the target song track does not have any associated reference keys, this area has no security protection and further analysis is unnecessary. In this case, the routine 500 passes from step 506 to step 516, where the controller 172 provides an audible output of the requested song track from the media 176. Following step 516, the sequence 500 ends in step 518.

If the target song track is protected, however, step 506 advances to step 508. In step 508 the controller 172 determines song track's security type. Namely, the controller 172 consults security type 147 in metadata stored on the media 176 to determine whether Play operations are permitted without submittal of a suitable proposed access key. If Play operations are not protected, step 508 advances to step 516, where the controller 172 interacts with the media 176 to read and output (Play) the requested song track (step 516), and then the sequence 500 ends in step 518. Optionally, the proposed key may be used to decrypt the requested song if the song has been stored on the media 176 with encryption.

If step 508 finds that Playback of the requested song track is protected, the routine 500 advances from step 508 to step 510. In step 510, the controller 172 checks the user-submitted proposed key (received in step 504) against the reference security key (found in the requested song's metadata). In one example, step 510 involves comparing the proposed and reference security keys to see whether they match. Alternatively, step 510 may apply a predetermined processing sequence to derive a second key from the proposed key (such as by decryption using a prescribed private key), with this derived key being compared against the reference security key. Alternative, the reference security key may be processed to derive a second key, with the derived key being compared to the proposed key. Other alternatives are also contemplated, such as processing both reference and proposed keys and comparing their derivatives.

At any rate, if the proposed key (or its derivative) does not match the reference security key, step 512 concludes that the proposed key is not valid. In this case, the controller 172 returns an error condition to the requesting host in step 514. Otherwise, if the proposed key (or its derivative) matches the reference access key (or its derivative), step 512 concludes that the proposed access key is valid, and the controller 172 directs the storage 108 to complete the requested Play operation in step 516. After steps 514 or 516, the sequence 500 ends in step 518.

Activate New Host

Figure 6:
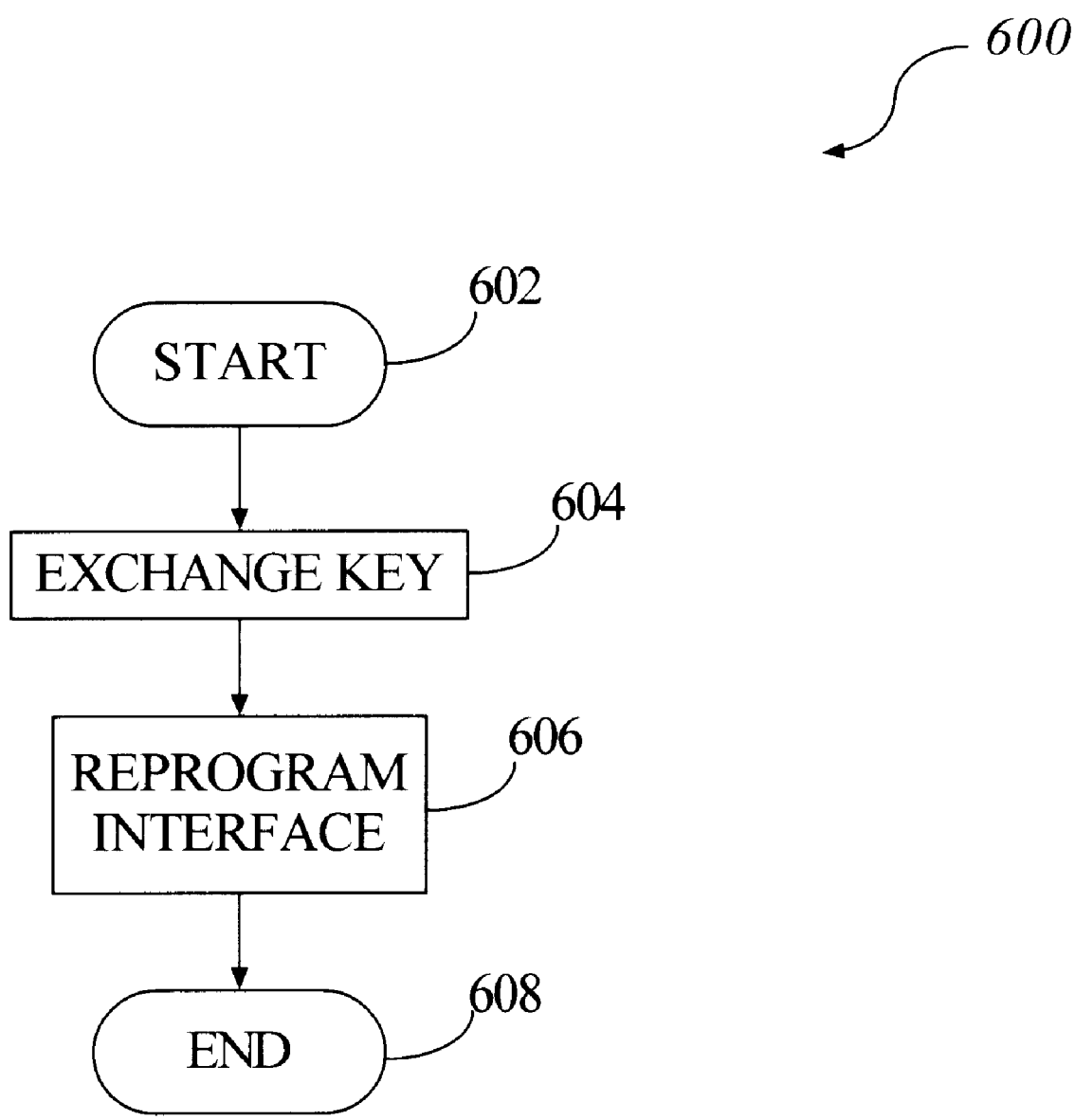
FIG. 6 is a flowchart showing operations performed by a new host to join the data storage system of the invention.

FIG. 6 shows a sequence 600 performed by a new host in order to join the system 100, and participate in future allocation and/or data access requests. For ease of explanation, but without any limitation intended thereby, the example of FIG. 6 is described in the context of the environment described above in FIGS. 1A–3. Generally, to add a new host, the new host obtains reference security keys for the user data to be accessed in the future. In addition, the new host must configure its own interface (not shown) with the controller 106 to properly communicate the contents of a storage access request.

More particularly, after the sequence 600 begins in step 602, the new host obtains one or more existing reference security keys from a source such as other hosts 102–104, the controller 106, application programs 110–112, user input, system administrator, etc. This step is optional, however, since there may be no need or intention for the new host to access user data that is already protected. A host-host exchange of reference security keys may be conducted over the network 130 or over the links (not shown), for example.

After step 604, the new host's application program reconfigures its interface with the controller in step 606. The new host's interface (not shown) may comprise an ESCON interface, small computer standard interface (SCSI), parallel or serial port, telephone modem, or any other digital data communications medium compatible with the particular embodiment of controller used in the system 100. In one example, the host interface may already be configured to receive storage access requests, e.g., components such as identification of targeted user data, security types, etc.; in this case, step 606 involves reconfiguring the host interface to accept submittal of proposed keys in the future. In the case of an ESCON interface, this may involve adding a new channel command word, or modifying an existing channel command word to accept an proposed access key. In the case of a SCSI interface, the SCSI protocol is modified in step 606 to accept the input access parameter.

Advantageously, the addition of new hosts does not require any security modification since the reference security keys are stored at the controller 106 or storage 108.

Bypass

Optionally, an internal setting may be provided within the controller 106 to bypass key checking in certain predefined environments or events. For example, bypass may be desirable during disaster recovery, backup, data migration, and other operations.

Reset Access Key & Operation Parameter

As an additional enhancement to the foregoing embodiment, the controller 106 may additionally recognize a "reset-key" command issued by hosts 102–104. The reset-key command directs the controller 106 to alter the access characteristics of an allocated storage region or stored data object. An illustrative reset-key includes a proposed key, along with a replacement reference security key and/or security type for the allocated storage region or user data. In response, the controller 106 validates the proposed key, and then proceeds to update its reference location (e.g., storage use map 124 or metadata). Otherwise, if the proposed key is invalid, the controller 106 fails the reset request. Along these lines, the invention also contemplates a "clear-key" command issued by hosts 102–104 to remove security protection of an allocated storage region or stored data object.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A data storage method for use in a storage system including a storage controller serving one or more hosts where the storage controller is coupled to a digital data storage, the storage containing host-accessible user data accessed by the storage controller on behalf of hosts and host-inaccessible metadata used by the storage controller to manage storage of the host-accessible data, the method comprising operations of:

the storage controller receiving a write request from one of the hosts, the request including target data and a security key;

the storage controller storing the target data in the digital data storage and storing the security key in metadata in association with the target data;

requiring host provision of a security key with prescribed relationship to the stored security key as a condition to granting future host requests to access the target data in the digital data storage.

2. The method of claim 1, the requiring operation comprising:

requiring host provision of a security key matching the stored security key as a condition to granting future host requests to access the target data in the digital data storage.

3. The method of claim 1, the requiring operation comprising:

as a condition to granting future host requests to access the target data in the digital data storage, requiring host provision of a security key that matches the stored security key when processed by a predetermined encryption process.

4. The method of claim 1, the operation of the storage controller storing the target data comprising operations of:

encrypting the target data with the security key and storing the encrypted target data.

5. The method of claim 1, where the digital data storage comprises a storage device including a device controller, and the storage controller is embodied by the device controller.

6. A data storage method for use in a storage system including a storage controller coupled to a digital data storage where the storage controller serves one or more hosts, the storage containing host-accessible user data accessed by the storage controller on behalf of hosts and host-inaccessible metadata used by the storage controller to manage storage of the host-accessible data, the method comprising operations of:

the storage controller receiving an allocation request from one of the hosts;

the storage controller allocating a region of the digital data storage and storing a security key in metadata associated with the allocated region;

requiring host provision of a security key with prescribed relation to the stored security key as a condition to granting future host requests to access data in the allocated region of the digital data storage.

7. The method of claim 6, the requiring operation comprising:

requiring host provision of a security key matching the stored security key as a condition to granting future host requests to access the target data in the digital data storage.

8. The method of claim 6, the requiring operation comprising:

as a condition to granting future host requests to access the target data in the digital data storage, requiring host provision of a security key that matches the stored security key when processed by a predetermined encryption process.

9. The method of claim 6, where the digital data storage comprises a storage device including a device controller, and the storage controller is embodied by the device controller.

10. A data security method for use in a storage system including a storage controller responsive to one or more hosts where the storage controller is coupled to a digital data storage, the storage containing host-accessible user data accessed by the storage controller on behalf of hosts and host-inaccessible metadata used by the storage controller to manage storage of the host-accessible data, the method comprising operations of:

the storage controller receiving a storage access request from one of the hosts, the request including a proposed security key and an identification of a requested data object contained on the digital data storage;

the storage controller retrieving a security key stored in metadata of the requested data object in the digital data storage, and then determining whether the stored security key and the proposed security key exhibit a prescribed relationship; and only if the proposed and stored security keys exhibit the prescribed relationship, the storage controller executing the storage access request, otherwise aborting the storage access request.

11. The method of claim 10, the method being implemented such that the storage controller comprises a sound recording player and the host is a user.

12. A signal-bearing medium tangibly embodying a program of machine-readable instructions executable by a digital processing apparatus to perform data storage operations in a storage system including a storage controller coupled to a digital data storage and serving data requests of one or more hosts, the storage containing host-accessible user data accessed by the storage controller on behalf of hosts and host-inaccessible metadata used by the storage controller to manage storage of the host-accessible data, the operations comprising:

the storage controller receiving a write request from one of the hosts, the request including target data and a security key;

the storage controller storing the target data in the digital data storage and storing the security key in metadata in association with the target data;

requiring host provision of a security key with prescribed relation to the stored security key as a condition to granting future host requests to access the target data in the digital data storage.

13. The medium of claim 12, the requiring operation comprising:

requiring host provision of a security key matching the stored security key as a condition to granting future host requests to access the target data in the digital data storage.

14. The medium of claim 12, the requiring operation comprising:

as a condition to granting future host requests to access the target data in the digital data storage, requiring host provision of a security key that matches the stored security key when processed by a predetermined encryption process.

15. The medium of claim 12, the operation of the storage controller storing the target data comprising operations of:

encrypting the target data with the security key and storing the encrypted target data.

16. The medium of claim 12, where the digital data storage comprises a storage device including a device controller, and the storage controller is embodied by the device controller.

17. A signal-bearing medium tangibly embodying a program of machine-readable instructions executable by a digital processing apparatus to perform data storage operations in a storage system including a storage controller coupled to a digital data storage and serving data requests of one or more hosts, the storage containing host-accessible user data accessed by the storage controller on behalf of hosts and host-inaccessible metadata used by the storage controller to manage storage of the host-accessible data, the operations comprising:

the storage controller receiving an allocation request from one of the hosts;

the storage controller allocating a region of the digital data storage and storing a security key in metadata associated with the allocated region;

requiring host provision of a security key with prescribed relation to the stored security key as a condition to granting future host requests to access data in the allocated region of the digital data storage.

18. The medium of claim 17, the requiring operation comprising:

requiring host provision of a security key matching the stored security key as a condition to granting future host requests to access the target data in the digital data storage.

19. The medium of claim 17, the requiring operation comprising:

as a condition to granting future host requests to access the target data from the digital data storage, requiring host provision of a security key that matches the stored security key when processed by a predetermined encryption process.

20. A signal-bearing medium tangibly embodying a program of machine-readable instructions executable by a digital processing apparatus to perform data storage operations in a storage system including a storage controller coupled to a digital data storage and serving one or more hosts, the storage containing host-accessible user data accessed by the storage controller on behalf of hosts and host-inaccessible metadata used by the storage controller to manage storage of the host-accessible data, the operations comprising:

the storage controller receiving a storage access request from one of the hosts, the request including a proposed security key and an identification of a requested data object contained on the digital data storage;

the storage controller retrieving a security key stored in metadata of the requested data object in the digital data storage, and then determining whether the stored security key and the proposed security key exhibit the prescribed relationship; and only if the proposed and stored security keys exhibit the prescribed relationship, the storage controller executing the storage access request, otherwise aborting the storage access request.

21. A data storage system accessible by one or more hosts, comprising:

a digital data storage containing user data and describing the user data;

the storage controller, coupled to the storage, and programmed to utilize the metadata to manage the user data while rendering the metadata inaccessible to hosts and to selectively access the user data on behalf of hosts by performing operations comprising:

receiving a write request from one of the hosts, the request including target data and a security key;

storing the target data in the digital data storage and storing the security key in metadata in association with the target data;

requiring host provision of a security key with prescribed relation to the stored security key as a condition to granting future host requests to access the target data in the digital data storage.

22. The system of claim 21, where the digital data storage comprises a storage device including a device controller, and the storage controller is embodied by the device controller.

23. The system of claim 21, where the storage controller is embodied by a digital data processing apparatus dedicated to managing one or more device controllers.

24. The system of claim 21, where the storage controller comprises a disk drive controller and the storage comprises magnetic disk media.

25. The system of claim 21, where the storage controller comprises a removable storage media controller.

26. The system of claim 21, further comprising a computer network coupled to the storage controller and interconnecting the storage controller to the hosts.

27. A data storage system accessible by one or more hosts, comprising:

a digital data storage containing user data and metadata describing the user data;

a storage controller, coupled to the storage, and programmed to utilize the metadata to manage the user data while rendering the metadata inaccessible to hosts and to selectively access the user data on behalf of hosts and programmed to perform further operations comprising:

the storage controller receiving an allocation request from one of the hosts;

the storage controller allocating a region of the digital data storage and storing a security key in metadata associated with the allocated region;

requiring host provision of a security key with prescribed relation to the stored security key as a condition to granting future host requests to access data in the allocated region of the digital data storage.

28. The system of claim 27, where the digital data storage comprises a storage device including a device controller, and the storage controller is embodied by the device controller.

29. The system of claim 27, where the storage controller is embodied by a digital data processing apparatus dedicated to managing one or more device controllers.

30. The system of claim 27, where the storage controller comprises a disk drive controller and the storage comprises magnetic disk media.

31. The system of claim 27, where the storage controller comprises a controller for removable storage media.

32. The system of claim 27, further comprising a computer network coupled to the storage controller and interconnecting the storage controller to the hosts.

33. A storage controller programmed to perform operations to manage access to digital data storage containing host-accessible user data accessible by the storage controller on behalf of hosts and also containing host-inaccessible metadata accessible by the storage controller to manage storage of the host-accessible data, the operations comprising:

the storage controller receiving a storage access request from one of the hosts, the request including a proposed security key and an identification of a requested data object contained on the digital data storage;

the storage controller retrieving a security key stored in metadata of the requested data object in the digital data storage, and then determining whether the stored security key and the proposed security key exhibit a prescribed relationship; and only if the proposed and stored security keys exhibit the prescribed relationship, the storage controller executing the storage access request, otherwise aborting the storage access request.

34. The storage controller of claim 33, the storage controller being programmed such that the execution of the storage access requests comprises playback of recorded sounds contained on the digital data storage.

35. A data storage system accessible by one or more hosts, comprising:

digital data storage means for containing user data; and the storage controller means, coupled to the storage means, for utilizing the metadata to manage the user data while rendering the metadata inaccessible to hosts selectively accessing the user data on behalf of host:

receiving a write request from one of the hosts, the request including target data and a security key;

storing the target data in the storage means and storing the security key in metadata in association with the target data;

requiring host provision of a security key with prescribed relation to the stored security key as a condition to granting future host requests to access the target data in the storage means.

36. A data storage system accessible by one or more hosts, comprising:

digital data storage means for containing user data and metadata describing the user data;

the storage controller means, coupled to the storage means, for utilizing the metadata to manage the user data while rendering the metadata inaccessible to hosts selectively accessing the user data on behalf of hosts and managing access to the digital data storage by hosts by:

the storage controller receiving an allocation request from one of the hosts;

the storage controller allocating a region of the storage means and storing a security key in metadata associated with the allocated region;

requiring host provision of a security key with prescribed relation to the stored security key as a condition to granting future host requests to access data in the allocated region of the storage means.

37. A data storage system accessible by one or more hosts, comprising:

digital data storage means for containing user data and metadata describing the user data;

the storage controller means, coupled to the storage means, for utilizing the metadata to manage the user data while rendering the metadata inaccessible to hosts selectively accessing the user data on behalf of hosts and managing access to the digital data storage by hosts by:

the storage controller receiving a storage access request from one of the hosts, the request including a proposed security key and an identification of a requested data object contained on the storage means;

the storage controller retrieving a security key stored in metadata of the requested data object in the storage means, and then determining whether the stored security key and the proposed security key exhibit a prescribed relationship; and only if the proposed and stored security keys exhibit the prescribed relationship, the storage controller executing the storage access request, otherwise aborting the storage access request.

38. A method of distributing sound recordings with selective playback characteristics, comprising operations of:

distributing machine-readable data storage media to customers, each including numerous sound segments each segment including a sound recording and metadata including an associated security key;

where the data storage media have a format that is unreadable by conventional playback devices, by including specific structure for use by playback devices requiring customer input of a security key with prescribed relationship to the stored security key as a condition to playback of the sound recording associated with the security key;

selling security keys to customers.

39. The method of claim 38, where certain sound segments are associated with multiple security keys such that different keys provide access to different combinations of sound segments.

40. The method of claim 39, where one security key provides access to all sound segments on a data storage medium.

41. The method of claim 39, where some data storage media have sound segments that do not include any associated security key.

42. The method of claim 10, where:

if the storage access request is a read operation, the operation of executing the storage access request further comprises reading the requested data object and using at least one of the proposed security key and retrieved security key to decode the data object.

43. The method of claim 10, wherein the operations further comprise:

the storage controller retrieving an operation parameter associated with the requested data object, said operation parameter identifying allowed access types for the requested data object;

the storage controller additionally requiring that the storage access request be allowed in order to execute the storage access request.

44. The method of claim 43, wherein:

the access types including the following operations: reading data from the storage, and writing data to the storage; and each operation parameter designates one or more of the access types as being allowed.

45. The medium of claim 20, where:

if the storage access request is a read operation, the operation of executing the storage access request further comprises reading the requested data object and using at least one of the proposed security key and retrieved security key to decode the data object.

46. The medium of claim 20, wherein the operations further comprise:

the storage controller retrieving an operation parameter associated with the requested data object, said operation parameter identifying allowed access types for the requested data object;

the storage controller additionally requiring that the storage access request be allowed in order to execute the storage access request.

47. The medium of claim 46, wherein:

the access types including the following operations: reading data from the storage, and writing data to the storage; and each operation parameter designates one or more of the access types as being allowed.

48. The storage controller of claim 33, where the storage controller is programmed such that:

if the storage access request is a read operation, the operation of executing the storage access request further comprises reading the requested data object and using at least one of the proposed security key and retrieved security key to decode the data object.

49. The storage controller of claim 33, the storage controller being programmed such that the operations further comprise:

the storage controller retrieving an operation parameter associated with the requested data object, said operation parameter identifying allowed access types for the requested data object;

the storage controller additionally requiring that the storage access request be allowed in order to execute the storage access request.

50. The controller of claim 49, wherein the controller is programmed such that:

the access types including the following operations: reading data from the storage, and writing data to the storage; and each operation parameter designates one or more of the access types as being allowed.

* * * * *